United States Patent
Takada et al.

(10) Patent No.: US 12,428,709 B2
(45) Date of Patent: Sep. 30, 2025

(54) ULTRA-FINE CEMENTED CARBIDE, AND CUTTING TOOL AND WEAR-RESISTANT TOOL USING THE SAME

(71) Applicant: NIPPON TOKUSHU GOUKIN CO., LTD., Gamagori (JP)

(72) Inventors: Masayuki Takada, Gamagori (JP); Tomohiro Tsutsumi, Gamagori (JP)

(73) Assignee: NIPPON TOKUSHU GOUKIN CO., LTD., Gamagori (JP)

( * ) Notice: Subject to any disclaimer, the term of this patent is extended or adjusted under 35 U.S.C. 154(b) by 393 days.

(21) Appl. No.: 17/836,240

(22) Filed: Jun. 9, 2022

(65) Prior Publication Data

US 2022/0298612 A1    Sep. 22, 2022

Related U.S. Application Data

(63) Continuation of application No. PCT/JP2020/006449, filed on Feb. 19, 2020.

(30) Foreign Application Priority Data

Jan. 14, 2020 (JP) .................. 2020-003496

(51) Int. Cl.
C22C 29/08 (2006.01)
B22F 3/15 (2006.01)
B23B 27/14 (2006.01)

(52) U.S. Cl.
CPC ........... *C22C 29/08* (2013.01); *B22F 3/15* (2013.01); *B23B 27/148* (2013.01); *B22F 2302/10* (2013.01)

(58) Field of Classification Search
None
See application file for complete search history.

(56) References Cited

FOREIGN PATENT DOCUMENTS

| CN | 1426488 A | 6/2003 |
| CN | 109652697 A | 4/2019 |

(Continued)

OTHER PUBLICATIONS

International Search Report (ISR) (PCT Form PCT/ISA/210), in PCT/JP2020/006449, dated Apr. 21, 2020 and English Translation thereof.

(Continued)

*Primary Examiner* — Daniel J. Schleis
(74) *Attorney, Agent, or Firm* — MCGINN I.P. LAW GROUP, PLLC

(57) ABSTRACT

Provided is an ultra-fine cemented carbide that has high hardness and exhibits excellent transverse-rupture-strength. The ultra-fine cemented carbide includes a hard phase, containing tungsten carbide (WC) as a main component, in an amount of 80 wt % or more and 99.4 wt % or less, a carbonitride phase, containing titanium carbonitride (Ti(C, N)) as a main component produced by carbonitriding of a titanium (Ti) oxide during sintering, in an amount of 0.1 wt % or more and 10.0 wt % or less, and a binder phase, containing at least one selected from cobalt (Co), nickel (Ni), or iron (Fe) as a main component, in an amount of 0.50 wt % or more and 20 wt % or less, and the binder phase contains chromium carbide ($Cr_3C_2$) in an amount of 0.10 wt % or more and 20.0 wt % or less based on all of the binder phase, and in the ultra-fine cemented carbide, the hard phase, the carbonitride phase, and the binder phase total 100 wt %, WC after the sintering has an average grain size of 1.0 μm or less, the nitrogen content is 0.10 wt % or more and 1.25 wt % or less, and the carbon content is 4.80 wt % or more and 6.30 wt % or less.

13 Claims, 5 Drawing Sheets

(56) References Cited

FOREIGN PATENT DOCUMENTS

| | | |
|---|---|---|
| CN | 110651056 A | 1/2020 |
| JP | 2010-504426 A | 2/2010 |
| JP | 2012-251242 A | 12/2012 |
| JP | 2016-098393 A | 5/2016 |
| JP | 2017186624 A | 10/2017 |
| JP | 6227517 B2 * | 11/2017 |

OTHER PUBLICATIONS

Written Opinion of the International Searching Authority (PCT Form PCT/ISA/237), in PCT/JP2020/006449, dated Apr. 21, 2020.
European Search Report dated Jan. 3, 2024 in European Patent Application No. 20913741.3.
Chinese Office Action, dated Mar. 19, 2025 in Chinese Application No. 202080084790.X and English Translation thereof.

* cited by examiner

ULTRA-FINE CEMENTED CARBIDE, AND CUTTING TOOL AND WEAR-RESISTANT TOOL USING THE SAME

CROSS REFERENCE TO RELATED APPLICATIONS

This application is a Continuation Application of PCT International Application No. PCT/JP2020/006449 filed on Feb. 19, 2020, which claims priority to Japanese Patent Application No. 2020-003496 filed on Jan. 14, 2020, the entire disclosures of the applications being considered part of the disclosure of this application and hereby incorporated by reference.

TECHNICAL FIELD

The present invention relates to an ultra-fine cemented carbide. The present invention also relates to a cutting tool and a wear-resistant tool manufactured using the ultra-fine cemented carbide.

BACKGROUND ART

Cemented carbides are widely used as cutting tools (such as micro drills) for metal materials such as steel, cast steel, manganese steel, and stainless steel and as wear-resistant tools such as dies for steel cord wire drawing (drawing dies), plugs, nozzles, and molding dies. Cemented carbides used in a particularly wide range contain, as a main component, tungsten carbide (hereinafter referred to as "WC") grains forming a mechanically stable hard phase. Cemented carbides containing fine WC grains having an average grain size of less than 1.0 μm (cemented carbides containing such fine grains as a main component are particularly referred to as an "ultra-fine cemented carbide") have a much higher hardness (degree of hardness) than general cemented carbides having an average grain size of 1.0 μm or more.

In addition to the hardness, the transverse-rupture-strength (TRS) is known as a physical property of a cemented carbide. The transverse-rupture-strength is also called bending strength, and is indicated by the maximum stress produced in a sample when the sample is broken by the bending load. The transverse-rupture-strength is generally indicated by a unit of pascal (Pa).

A cemented carbide shows a higher hardness as the cemented carbide includes a smaller amount of binder phase used for bonding WC grains to each other. A cemented carbide including a certain amount of binder phase shows a higher hardness as the cemented carbide contains finer WC grains. Meanwhile, it is known that the transverse-rupture-strength depends on the amount of the binder phase, and it is also known that the transverse-rupture-strength is increased by using hot isostatic pressing (HIP) in the sintering treatment.

Japanese Laid-Open Publication No. 2016-98393 discloses a cemented carbide that contains tungsten carbide (WC), titanium carbonitride (Ti(C,N)), chromium carbide ($Cr_3C_2$), and cobalt (Co), and is excellent in both hardness and transverse-rupture-strength.

BRIEF DESCRIPTION OF THE INVENTION

An object of the present invention is to provide an ultra-fine cemented carbide having high hardness and further having excellent transverse-rupture-strength.

An object of the present invention is also to provide an ultra-fine cemented carbide having excellent transverse-rupture-strength and further having little deterioration of the hardness under a high-temperature condition.

The ultra-fine cemented carbide according to the present invention includes a hard phase, containing tungsten carbide (WC) as a main component, in an amount of 80.0 wt % or more and 99.4 wt % or less, a carbonitride phase, containing titanium carbonitride (Ti(C,N)) as a main component produced by carbonitriding of a titanium (Ti) oxide during sintering, in an amount of 0.10 wt % or more and 10.0 wt % or less, and a binder phase, containing at least one selected from cobalt (Co), nickel (Ni), or iron (Fe) as a main component, in an amount of 0.5 wt % or more and 20.0 wt % or less, and the binder phase contains chromium carbide ($Cr_3C_2$) in an amount of 0.10 wt % or more and 20.0 wt % or less based on all of the binder phase, and in the ultra-fine cemented carbide, the hard phase, the carbonitride phase, and the binder phase total 100 wt %, tungsten carbide after the sintering has an average grain size of 1.0 μm or less, the nitrogen content is 0.10 wt % or more and 1.25 wt % or less, and the carbon content is 4.80 wt % or more and 6.30 wt % or less. Needless to say, the ultra-fine cemented carbide may contain an inevitable impurity, which is present in the raw material of the cemented carbide product or is inevitably mixed in the process of manufacturing the cemented carbide product, and is unnecessary but allowable because the amount of the inevitable impurity is so small that the properties of the cemented carbide product are not affected.

The ultra-fine cemented carbide according to the present invention contains tungsten carbide (WC), titanium carbonitride (Ti(C,N)), and chromium carbide ($Cr_3C_2$), so that the ultra-fine cemented carbide contains carbon (C) and nitrogen (N).

The titanium carbonitride (Ti(C,N)) is used in order to inhibit grain growth of the tungsten carbide (WC) and keep the WC grains ultrafine (having an average diameter of 1.0 μm or less). The titanium carbonitride (Ti(C,N)) itself is not used as a starting material, and an oxide of titanium (Ti) is used as a starting material. The titanium carbonitride (Ti(C,N)) is obtained by carbonitriding of the titanium oxide during sintering. As a result, the ultra-fine cemented carbide can contain more fine titanium carbonitride, and thus tungsten carbide (WC) growth that leads to deterioration of the hardness can be effectively inhibited.

Carbon (C) and nitrogen (N) are necessary in order to obtain the titanium carbonitride (Ti(C,N)) by carbonitriding of the titanium oxide during sintering. The necessary carbon is supplied by blending a carbon raw material powder. The necessary nitrogen is supplied by sintering treatment in a nitrogen atmosphere.

The amount of carbon to be blended and the amount of nitrogen to be supplied (the nitrogen partial pressure in a nitrogen atmosphere) can be controlled to adjust the amount of carbon (carbon content) and the amount of nitrogen (nitrogen content) contained in the ultra-fine cemented carbide that is finally manufactured. The ultra-fine cemented carbide according to the present invention containing nitrogen at a content of 0.10 wt % or more and 1.25 wt % or less and carbon at a content of 4.80 wt % or more and 6.30 wt % or less has a hardness of 92.3 HRA or more and a transverse-rupture-strength of 3.5 GPa or more.

The nitrogen content in the ultra-fine cemented carbide is preferably 0.10 wt % or more and 0.35 wt % or less, and the carbon content in the ultra-fine cemented carbide is preferably 5.30 wt % or more and 5.60 wt % or less. In this case, the transverse-rupture-strength is 4.0 GPa or more, and an ultra-fine cemented carbide having further excellent transverse-rupture-strength is provided.

The nitrogen content in the ultra-fine cemented carbide is more preferably 0.10 wt % or more and 0.25 wt % or less. This case can provide an ultra-fine cemented carbide having a larger transverse-rupture-strength, for example, a transverse-rupture-strength of 4.5 GPa or more.

The transverse-rupture-strength of the ultra-fine cemented carbide also depends on the carbon content in the ultra-fine cemented carbide. The carbon content in the ultra-fine cemented carbide is preferably 5.30 wt % or more and 5.43 wt % or less. Such an ultra-fine cemented carbide can exhibit a relatively high transverse-rupture-strength.

The transverse-rupture-strength of the ultra-fine cemented carbide also depends on the amount of the included carbonitride phase described above. The ultra-fine cemented carbide preferably includes the carbonitride phase in an amount of 0.5 wt % or more and 2.0 wt % or less. In particular, the ultra-fine cemented carbide including the carbonitride phase in an amount of about 1.30 wt % can exhibit the maximum transverse-rupture-strength.

The grain size of the tungsten carbide (WC) also affects the transverse-rupture-strength of the ultra-fine cemented carbide. The ultra-fine cemented carbide can exhibit a transverse-rupture-strength of more than 4.0 GPa with the tungsten carbide having an average grain size of 0.80 µm or less.

The ultra-fine cemented carbide preferably includes the binder phase in an amount of 10.0 wt % or less. Such an ultra-fine cemented carbide can keep high hardness even in a high-temperature atmosphere, for example, at 400° C., 600° C., or 800° C.

The present invention also provides a cutting tool (such as a micro drill) and a wear-resistant tool (such as a die, a plug, or a nozzle) including the above-described ultra-fine cemented carbide.

DETAILED DESCRIPTION OF THE INVENTION

Figure 1:
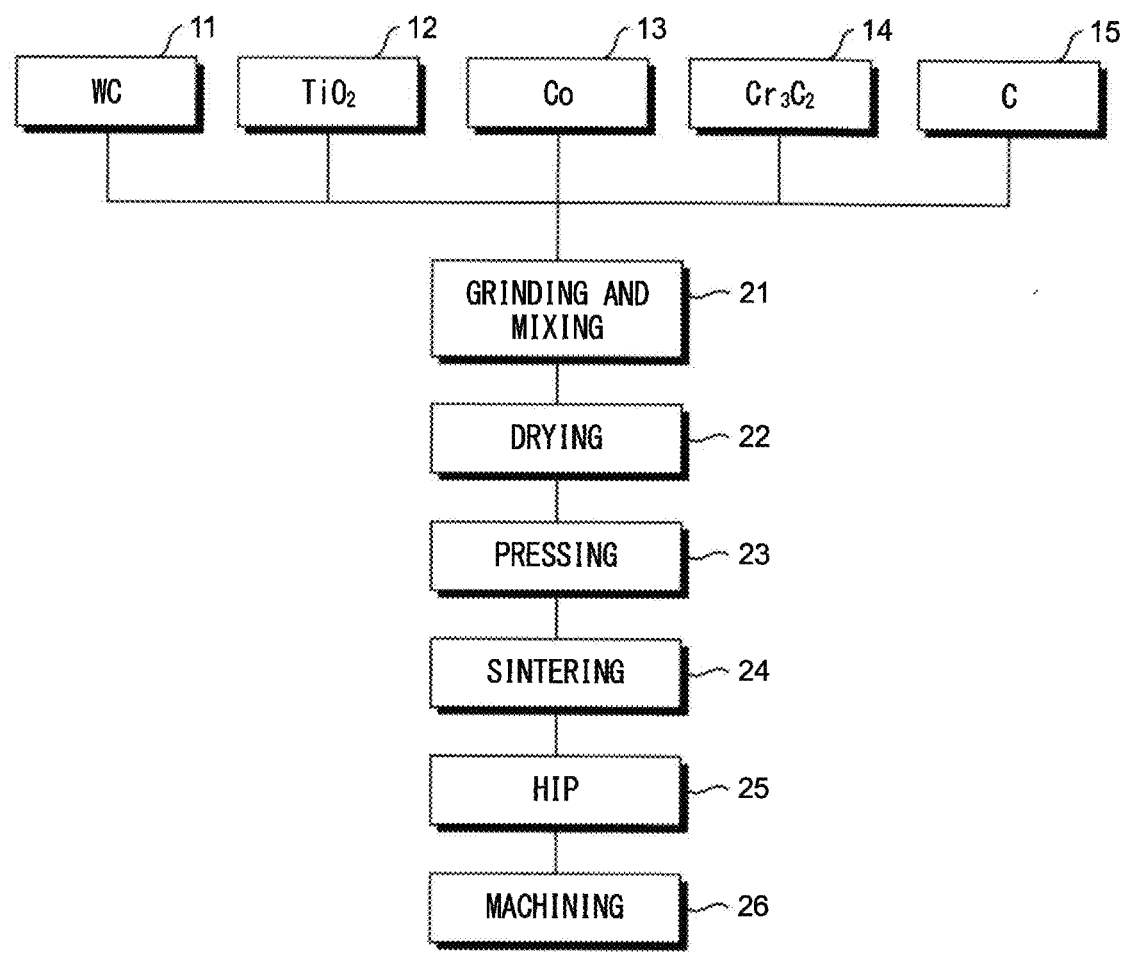
FIG. 1 is a flowchart showing an example of a process of manufacturing a cemented carbide tool.

The ultra-fine cemented carbide according to embodiments of the present invention is a so-called tungsten carbide-based cemented carbide including a hard phase containing tungsten carbide (WC) as a main component (hereinafter referred to as "WC phase" or "hard phase"), a carbonitride phase containing titanium carbonitride (Ti(C,N)) as a main component produced by carbonitriding of a titanium oxide ($TiO_2$) during sintering (hereinafter referred to as "carbonitride phase" or "Ti(C,N) phase"), and a binder phase containing cobalt (Co), nickel (Ni), or iron (Fe) or an alloy of these metals as a main component. As described below, the tungsten carbide forming the hard phase (WC phase) includes fine grains having a grain size of 1.0 µm or less, and therefore the tungsten carbide-based cemented carbide can be particularly referred to as tungsten carbide-based ultra-fine cemented carbide.

(1) Amount of Hard Phase (WC Phase) Contained

The ultra-fine cemented carbide includes the WC phase in an amount of 80.0 to 99.4 wt % based on all of the ultra-fine cemented carbide. If the amount of the WC phase is less than 80.0 wt %, the rate of the binder phase is relatively increased, and the grain growth in the WC phase (the grain growth in the WC phase will be described below) may be difficult to control (the WC average grain size after sintering may be more than 1.0 µm). If the WC phase is included in an amount of 80.0 wt % or more, grain growth in the WC phase can be effectively inhibited to set the WC average grain size after sintering to 1.0 µm or less (a so-called ultrafine grain size). If the amount of the WC phase is more than 99.4 wt %, the rate of the binder phase is relatively decreased, and the transverse-rupture-strength of the ultra-fine cemented carbide is decreased. The ultra-fine cemented carbide can secure the transverse-rupture-strength by including the WC phase in an amount of 99.4 wt % or less. The rate of the WC phase in all of the ultra-fine cemented carbide can be adjusted by the blending amount of the WC raw material powder.

(2) Amount of Carbonitride Phase (Ti(C,N) Phase) Contained

The carbonitride phase (Ti(C,N) phase) is used in order to inhibit grain growth in the WC phase described above and keep the grains in the WC phase ultrafine. The term "grain growth in the WC phase" refers to a phenomenon in which a WC phase dissolved in the binder phase precipitates as another WC phase during sintering and thus grains having a large diameter grow. The Ti(C,N) phase is added to intersperse Ti(C,N) around the WC phase, and thus the precipitation of the WC phase is reduced to inhibit grain growth in the WC phase. The amount of the Ti(C,N) phase is adjusted to an amount suitable for effectively inhibiting grain growth in the WC phase, that is, an amount of 0.10 wt % or more based on all of the ultra-fine cemented carbide and an amount such that Ti(C,N) does not aggregate or is not likely to aggregate, that is, an amount of 10.0 wt % or less. The rate of the Ti(C,N) phase in all of the ultra-fine cemented carbide can also be adjusted by the blending amount of the raw material powder (titanium oxide ($TiO_2$)) described below.

The Ti(C,N) phase capable of functioning as a grain growth inhibitor of the WC phase is produced by carbonitriding of titanium oxide ($TiO_2$) as a raw material powder during sintering, and thus the ultra-fine cemented carbide as a final product contains fine Ti(C,N). Ti(C,N), even in a small amount, can effectively inhibit grain growth in the WC phase. Ti(C,N) preferably has an average grain size in the range of 5 to 100 nm.

Carbon (C) and nitrogen (N) are necessary in order to obtain Ti(C,N) by carbonitriding of $TiO_2$. As described below, the carbon (C) is supplied by blending its raw material powder. The nitrogen (N) is supplied by sintering treatment in a nitrogen atmosphere.

(3) Amount of Binder Phase Contained

The binder phase is used in order to bond hard ultrafine WC grains to each other.

In the binder phase, cobalt (Co), nickel (Ni), or iron (Fe) can be used, or an alloy obtained by mixing these metals can also be used. The binder phase is a metal containing these metal elements as a main component (in an amount of 50.0 wt % or more based on all of the binder phase).

If the amount of the binder phase is less than 0.50 wt %, the transverse-rupture-strength of the ultra-fine cemented carbide is decreased, and if the amount of the binder phase is more than 20.0 wt %, the hardness of the ultra-fine cemented carbide is decreased. From these viewpoints, the ultra-fine cemented carbide includes the binder phase in an amount of 0.50 to 20.0 wt %. The WC grains that are firmly bonded to each other by the binder phase are prevented from falling from the ultra-fine cemented carbide, and thus the ultra-fine cemented carbide can secure the strength. The rate of the binder phase in all of the ultra-fine cemented carbide can also be adjusted by the blending amount of the raw material powder.

(4) Amount of Chromium Carbide ($Cr_3C_2$) Contained

Chromium carbide is used in order to inhibit grain growth in the WC phase and growth of the carbonitride phase. Chromium carbide is also known to contribute to improvement in hardness and oxidation resistance of the binder phase. Chromium carbide contained in an amount set to 0.10 wt % or more and 20.0 wt % or less based on all of the binder phase can be sufficiently dissolved in the binder phase.

(5) Carbon Content and Nitrogen Content

The ultra-fine cemented carbide as a final product contains carbon and nitrogen. That is, the ultra-fine cemented carbide according to embodiments of the present invention contains tungsten carbide (WC) and chromium carbide ($Cr_3C_2$), so that the ultra-fine cemented carbide inevitably contains carbon (C). Furthermore, the ultra-fine cemented carbide according to embodiments of the present invention contains Ti(C,N) for effective grain growth inhibition of the WC phase, and the Ti(C,N) is obtained by carbonitriding of $TiO_2$ in a nitrogen atmosphere as described above, so that the ultra-fine cemented carbide as a final product also contains nitrogen (N).

The inventors have focused on the carbon content and the nitrogen content in the ultra-fine cemented carbide as a final product, and have found that adjusting the carbon content and the nitrogen content changes the mechanical properties, particularly the transverse-rupture-strength, of the ultra-fine cemented carbide as a final product significantly. The carbon content in the ultra-fine cemented carbide can be controlled by adjusting the blending amount of the carbon raw material powder as described above, and the nitrogen content can be controlled by adjusting the partial pressure of the nitrogen gas supplied in the sintering treatment. The transverse-rupture-strength of the ultra-fine cemented carbide also depends on the amount of the binder phase included in the ultra-fine cemented carbide as described above. Hereinafter, the properties of the ultra-fine cemented carbide will be described in detail in the case of changing the carbon content and the nitrogen content and in the case of changing the amount of the binder phase.

First, a process of manufacturing a cemented carbide tool using the ultra-fine cemented carbide will be schematically described. FIG. 1 is a flowchart showing an example of a process of manufacturing a cemented carbide tool. Here, an example will be described in which a metal containing cobalt (Co) as a main component is used as the binder phase.

Predetermined amounts of raw material powders of tungsten carbide (WC) 11, titanium oxide ($TiO_2$) 12, cobalt (Co) 13, chromium carbide ($Cr_3C_2$) 14, and carbon (C) 15 are put in a cylindrical container, a large number of small cemented carbide balls are also put in the cylindrical container, and the cylindrical container is rotated. In the container, the raw material powders are ground and mixed (step 21) (ball mill). In order to enhance the grinding effect and prevent oxidation of the powders, an organic solvent such as acetone, an alcohol, or hexane is also put in the cylindrical container, and thus the raw material powders become a slurry (muddy) in the cylindrical container.

The raw material powders ground and mixed to be a slurry are then dried with a spray dryer method, a mixer drying method, or the like, and thus the organic solvent is removed from the raw material powders (step 22).

After the removal of the organic solvent, the raw material powders ground and mixed are subjected to die molding, rubber die molding, extrusion molding, or the like to be pressed (pressed together) and molded into a predetermined shape (step 23).

The molded product is sintered in a heating furnace in which a nitrogen gas is controlled at a predetermined partial pressure (step 24). The molded product is sintered at a temperature higher than the ternary eutectic temperature of tungsten-cobalt-carbon (W—Co—C) to obtain an ultra-fine cemented carbide containing the tungsten carbide (WC) 11 as a hard phase and the cobalt (Co) 13 as a binder phase.

The carbon (C) 15 is blended in the raw material powders ground and mixed as described above, and the heating furnace has a nitrogen atmosphere, resulting in carbonitriding of the titanium oxide ($TiO_2$) 12, which is one of the raw material powders, in the heating furnace, and thus the titanium carbonitride (Ti(C,N)) is produced as described above.

The ultra-fine cemented carbide may contain very small pores (porousness). In order to remove the pores, hot isostatic pressing (HIP) is performed (step 25). For example, an argon gas having a gas pressure of 20 to 100 MPa is applied to remove the pores.

Finally, shape machining, coating, and the like are performed to manufacture a cemented carbide tool (such as a cutting tool or a wear-resistant tool) in which the ultra-fine cemented carbide is used (step 26).

The amount of titanium carbonitride (Ti(C,N)), the blending amount of carbon (C), and the nitrogen partial pressure applied to the heating furnace in the sintering treatment (step 24) were appropriately changed to prepare 32 samples (No. 1 to No. 32). Table 1 shows the analysis results of the carbon content, the nitrogen content, the hardness, and the transverse-rupture-strength (TRS) of the samples. The 32 samples are the same in the average grain size of tungsten carbide (WC) (0.4 μm), the amount of chromium carbide ($Cr_3C_2$) contained (0.24 wt %), and the amount of cobalt (Co) contained (10 wt %).

TABLE 1

| No. | Ti (C, N) (wt %) | Nitrogen partial pressure (kPa) | Amount of carbon to be blended (wt %) | Carbon content (wt %) | Nitrogen content (wt %) | Hardness (HRA) | Transverse-rupture-strength (GPa) |
|---|---|---|---|---|---|---|---|
| 1 | 1.3 | 0.0 | 6.15 | 5.44 | 0.10 | 93.1 | 3.8 |
| 2 | | | 6.20 | 5.48 | 0.10 | 93.0 | 4.2 |

TABLE 1-continued

| No. | Ti (C, N) (wt %) | Nitrogen partial pressure (kPa) | Amount of carbon to be blended (wt %) | Carbon content (wt %) | Nitrogen content (wt %) | Hardness (HRA) | Transverse-rupture-strength (GPa) |
|---|---|---|---|---|---|---|---|
| 3  |     |          | 6.30 | 5.50 | 0.08 | 92.7 | 4.1 |
| 4  |     |          | 6.40 | 5.60 | 0.08 | 92.6 | 3.5 |
| 5  | 1.3 | 0.1–5.0  | 6.10 | 5.33 | 0.18 | 93.2 | 4.4 |
| 6  |     |          | 6.15 | 5.38 | 0.16 | 92.9 | 4.7 |
| 7  |     |          | 6.20 | 5.42 | 0.13 | 92.9 | 4.3 |
| 8  |     |          | 6.30 | 5.51 | 0.10 | 92.7 | 4.2 |
| 9  | 1.7 |          | 6.10 | 5.32 | 0.25 | 93.3 | 4.5 |
| 10 |     |          | 6.20 | 5.37 | 0.23 | 93.0 | 4.3 |
| 11 | 2.0 |          | 6.10 | 5.33 | 0.31 | 93.4 | 4.2 |
| 12 |     |          | 6.20 | 5.37 | 0.27 | 93.0 | 4.1 |
| 13 | 1.3 |          | 6.10 | 5.33 | 0.21 | 92.9 | 4.7 |
| 14 |     |          | 6.15 | 5.39 | 0.18 | 92.8 | 4.6 |
| 15 |     |          | 6.20 | 5.43 | 0.15 | 92.8 | 4.5 |
| 16 |     |          | 6.30 | 5.49 | 0.11 | 92.6 | 4.4 |
| 17 | 1.7 |          | 6.10 | 5.31 | 0.27 | 93.2 | 4.5 |
| 18 |     |          | 6.20 | 5.37 | 0.27 | 93.0 | 4.3 |
| 19 | 2.0 |          | 6.10 | 5.32 | 0.35 | 93.1 | 4.3 |
| 20 |     |          | 6.20 | 5.35 | 0.34 | 93.0 | 4.3 |
| 21 | 1.3 | 5.1–10.0 | 6.10 | 5.32 | 0.23 | 92.9 | 4.4 |
| 22 |     |          | 6.15 | 5.37 | 0.20 | 92.8 | 4.3 |
| 23 |     |          | 6.20 | 5.41 | 0.17 | 92.7 | 4.4 |
| 24 |     |          | 6.30 | 5.48 | 0.13 | 92.6 | 4.0 |
| 25 | 1.7 |          | 6.10 | 5.39 | 0.25 | 93.0 | 4.2 |
| 26 |     |          | 6.20 | 5.46 | 0.24 | 92.9 | 4.1 |
| 27 | 2.0 |          | 6.10 | 5.54 | 0.30 | 93.2 | 4.1 |
| 28 |     |          | 6.20 | 5.48 | 0.29 | 93.0 | 4.0 |
| 29 | 1.3 | 10.1–15.0| 6.00 | 5.21 | 0.25 | 92.6 | 3.7 |
| 30 |     |          | 6.10 | 5.32 | 0.22 | 92.4 | 4.2 |
| 31 |     |          | 6.20 | 5.42 | 0.19 | 92.3 | 4.0 |
| 32 |     |          | 6.30 | 5.48 | 0.16 | 92.3 | 3.9 |

The carbon content of each sample was measured with a non-dispersive infrared absorption method. The nitrogen content of each sample was measured with a thermal conduction method. The transverse-rupture-strength was measured in a three-point bending test, and the hardness was measured using a Rockwell hardness tester (A scale). All of the 32 samples shown in Table 1 have a hardness and a transverse-rupture-strength equivalent to or higher than those of existing ultra-fine cemented carbides (a hardness of 92.3 HRA or more and a transverse-rupture-strength of 3.5 GPa or more).

The other samples (No. 33 to No. 36) were prepared by appropriately changing the amount of cobalt (Co) contained as a binder phase. Table 2 shows the measurement results of the hardness and the transverse-rupture-strength (TRS) of the samples. As shown in Table 1, the sample No. 13 has a high transverse-rupture-strength. The samples No. 33 to No. 36 shown in Table 2 were prepared by increasing or decreasing the amount of cobalt (Co) from the standard value that is the amount of cobalt (Co) contained in the sample No. 13, that is, 10 wt %. The amounts of tungsten carbide, titanium carbonitride, and chromium carbide contained are also adjusted by increasing or decreasing the amount of cobalt (Co) contained.

TABLE 2

| No. | Amount of Co (wt %) | Hardness (HRA) | Transverse-rupture-strength (GPa) |
|---|---|---|---|
| 33 | 4.0  | 95.0 | 4.1 |
| 34 | 6.0  | 94.4 | 4.3 |
| 35 | 8.0  | 93.6 | 4.4 |
| 13 | 10.0 | 92.9 | 4.7 |
| 36 | 12.0 | 92.3 | 4.4 |

First, as can be seen referring to Table 2, the hardness and the transverse-rupture-strength of the ultra-fine cemented carbide are changed by increasing or decreasing the amount of cobalt (Co) contained as a binder phase. Table 2 shows that the change in transverse-rupture-strength is smaller than the change in hardness. That is, as described in detail below, the ultra-fine cemented carbide can maintain the transverse-rupture-strength and have a higher hardness than conventional ultra-fine cemented carbides by appropriately controlling the carbon content and the nitrogen content in the ultra-fine cemented carbide without paying close attention to the amount of the binder phase (Co) included.

First, it will be examined how much nitrogen content the ultra-fine cemented carbide is to have to exhibit a hardness and a transverse-rupture-strength equivalent to those of conventional ultra-fine cemented carbides.

Nitrogen is contained in the titanium carbonitride (Ti(C, N)) among a plurality of compositions included in the ultra-fine cemented carbide. Therefore, the nitrogen content in the ultra-fine cemented carbide can be considered to be approximately proportional to the amount of Ti(C,N) contained in the ultra-fine cemented carbide. As described above, the amount of Ti(C,N) is adjusted to 0.10 wt % or more and 10.0 wt % or less in order to effectively inhibit grain growth in the WC phase and prevent aggregation of Ti(C,N).

As can be seen referring to Table 1, the samples obtained by vacuum sintering (samples No. 1 to No. 4) also contain nitrogen at a content of about 0.1 wt %. For example, the sample No. 29 containing Ti(C,N) in an amount of 1.30 wt % has a nitrogen content of 0.25 wt %. Therefore, when the amount of Ti(C,N) is 10.0 wt %, the nitrogen content can be estimated to be about 1.25 wt %. That is, the ultra-fine cemented carbide containing titanium carbonitride (Ti(C,N)) in an amount of 0.10 wt % or more and 10.0 wt % or less has a nitrogen content of 0.10 wt % or more and 1.25 wt % or less.

Next, it will be examined how much carbon content the ultra-fine cemented carbide is to have to exhibit a hardness and a transverse-rupture-strength equivalent to those of conventional ultra-fine cemented carbides.

Carbon (C) is contained in three compositions, tungsten carbide (WC), titanium carbonitride (Ti(C,N)), and chromium carbide ($Cr_3C_2$), contained in the ultra-fine cemented carbide. The carbon content in the ultra-fine cemented carbide is adjusted by the addition amounts of the raw material powders of the tungsten carbide (WC) 11, the titanium oxide ($TiO_2$) 12, the chromium carbide ($Cr_3C_2$) 14, and the carbon (C) 15 described above.

When the amount of cobalt (Co) contained in the ultra-fine cemented carbide (0.50 wt % to 20 wt %) varies, the amount of tungsten carbide (WC) contained varies, and as a result, the carbon content in the ultra-fine cemented carbide also varies. As can be seen referring to Table 1, when the amount of cobalt (Co) contained was 10 wt %, the carbon content in the ultra-fine cemented carbide had a minimum value of 5.21 wt % (in the sample No. 29) and a maximum value of 5.60 wt % (in the sample No. 4). It is considered that if the amount of cobalt (Co) is 0.50 wt %, the amount of tungsten carbide (WC) contained in the ultra-fine cemented carbide is relatively increased, and as a result, the carbon content in the ultra-fine cemented carbide is increased to about 6.30 wt %. It is considered that if the amount of cobalt (Co) is 20 wt %, the amount of tungsten carbide (WC) contained in the ultra-fine cemented carbide is relatively decreased, and as a result, the carbon content in the ultra-fine cemented carbide becomes about 4.80 wt %.

Figure 2:
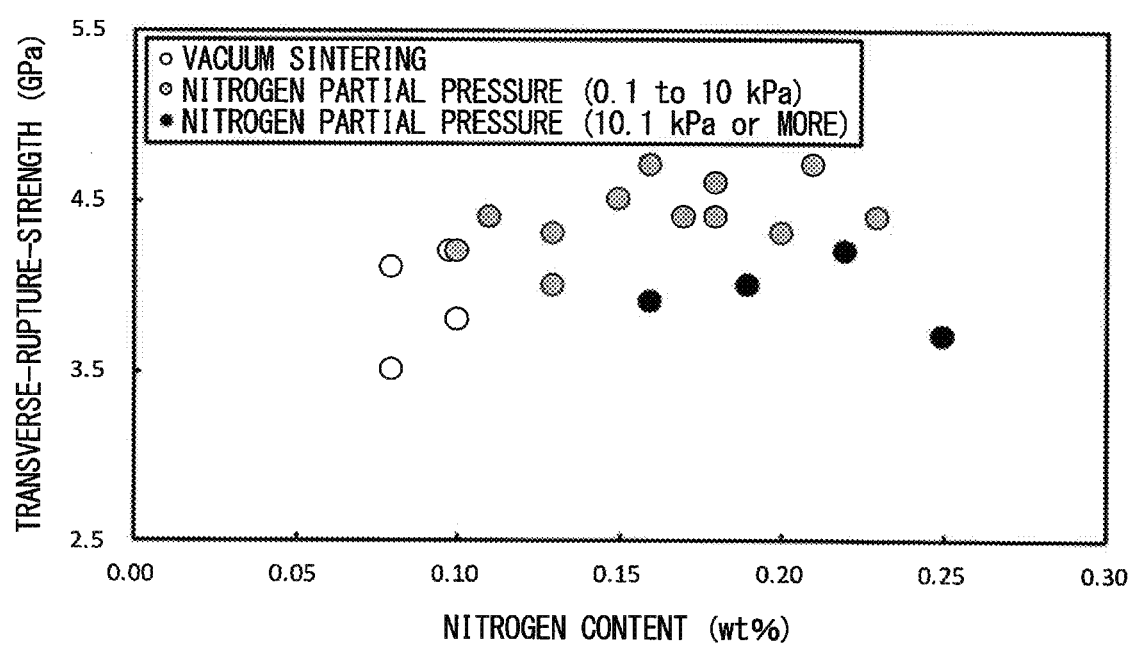
FIG. 2 is a graph showing the relationship between the nitrogen content and the transverse-rupture-strength in an ultra-fine cemented carbide.

FIG. 2 is a graph showing the relationship between the transverse-rupture-strength (TRS) (shown by the vertical axis) and the nitrogen content (shown by the horizontal axis), in particular, in each of the ultra-fine cemented carbide samples containing titanium carbonitride (Ti(C,N)) in an amount of 1.30 wt % (No. 1 to No. 8, No. 13 to No. 16, No. 21 to No. 24, and No. 29 to No. 32) among the 32 ultra-fine cemented carbide samples shown in Table 1. The reason why the ultra-fine cemented carbide containing titanium carbonitride (Ti(C,N)) in an amount of 1.30 wt % is focused on is that the samples that exhibited the highest transverse-rupture-strength in the samples No. 1 to No. 32 were No. 6 and No. 13, which contained titanium carbonitride (Ti(C,N)) in an amount of 1.30 wt %.

On the graph of FIG. 2, three kinds of circles, white, gray, and black circles, are plotted. The white circles represent the samples obtained by sintering treatment (step 24 in FIG. 1) in which vacuum sintering was performed (at a nitrogen partial pressure of 0 kPa) (No. 1 to No. 4), the gray circles represent the samples obtained by sintering treatment in which a sintering furnace was filled with a nitrogen gas having a nitrogen partial pressure of 0.1 to 10 kPa (No. 5 to No. 8, No. 13 to No. 16, and No. 21 to No. 24), and the black circles represent the samples obtained by sintering treatment in which a sintering furnace was filled with a nitrogen gas having a nitrogen partial pressure of 10.1 kPa or more (No. 29 to No. 32).

From the graph of FIG. 2, it can be seen that controlling the nitrogen partial pressure during sintering to 0.1 to 10 kPa (shown by the gray circles) clearly improves the transverse-rupture-strength of the ultra-fine cemented carbide on average more than vacuum sintering (shown by the white circles) and more than controlling the nitrogen partial pressure to 10.1 kPa or more (shown by the black circles). As can be seen referring to Table 1, the transverse-rupture-strength of the 32 samples showed a considerably high peak of 4.7 GPa (in the samples No. 6 and No. 13), and the nitrogen partial pressure at this time was 0.1 kPa to 5.0 kPa.

The ultra-fine cemented carbide prepared in an atmosphere having a nitrogen partial pressure of 0.1 to 10 kPa had a nitrogen content of 0.10 to 0.35 wt % (see No. 5 to No. 28 in Table 1). The ultra-fine cemented carbide having a nitrogen content in the range of 0.10 to 0.35 wt % can exhibit a relatively high transverse-rupture-strength.

Furthermore, as can be seen focusing on the gray circles in the graph of FIG. 2, the ultra-fine cemented carbide having a larger nitrogen content tends to have a larger transverse-rupture-strength. As described above, the ultra-fine cemented carbide that exhibited a peak transverse-rupture-strength (4.7 GPa) had a nitrogen content of 0.16 wt % (No. 6) and 0.21 wt % (No. 13). Therefore, an appropriate range of the nitrogen content to increase the transverse-rupture-strength is considered to be particularly in the range of 0.10 to 0.25 wt %.

Figure 3:
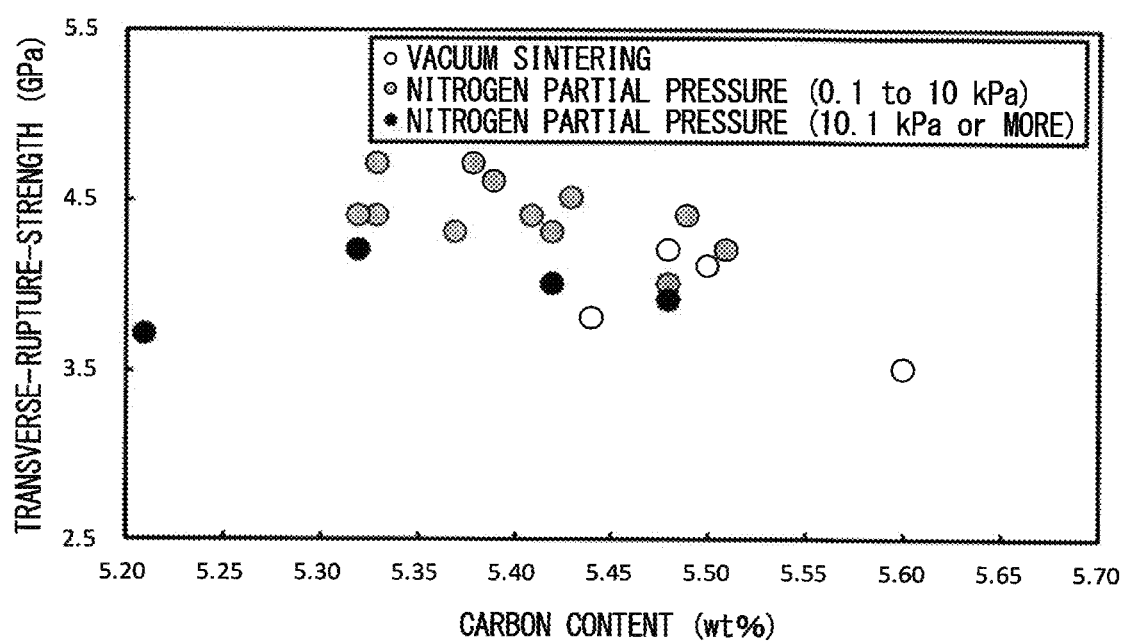
FIG. 3 is a graph showing the relationship between the carbon content and the transverse-rupture-strength in an ultra-fine cemented carbide.

FIG. 3 is a graph in which the horizontal axis shows the carbon content instead of the nitrogen content, and the vertical axis shows the transverse-rupture-strength as in FIG. 2. Similarly to the graph of FIG. 2, the graph of FIG. 3 shows the relationship between the transverse-rupture-strength (shown by the vertical axis) and the carbon content in the ultra-fine cemented carbide (shown by the horizontal axis) in each of the ultra-fine cemented carbide samples containing titanium carbonitride (Ti(C,N)) in an amount of 1.30 wt % (No. 1 to No. 8, No. 13 to No. 16, No. 21 to No. 24, and No. 29 to No. 32) by white circles (in the case of vacuum sintering), gray circles (in the case of a nitrogen partial pressure of 0.1 to 10 kPa), and black circles (in the case of a nitrogen partial pressure of 10.1 kPa or more).

Also from the graph of FIG. 3, it can be seen that the transverse-rupture-strength is improved by controlling the nitrogen partial pressure during sintering to 0.1 to 10 kPa (as shown by the gray circles). The ultra-fine cemented carbide prepared by controlling the nitrogen partial pressure to 0.1 to 10 kPa had a carbon content of 5.31 to 5.54 wt % (see Table 1). The ultra-fine cemented carbide having a carbon content in the range of 5.30 to 5.60 wt % can exhibit a relatively high transverse-rupture-strength.

Focusing on the gray circles in the graph of FIG. 3, it is confirmed that the ultra-fine cemented carbide having a smaller carbon content tends to have a larger transverse-rupture-strength. The ultra-fine cemented carbide that exhibited a peak transverse-rupture-strength (4.7 GPa) had a carbon content of 5.38 wt % (No. 6) and 5.33 wt % (No. 13). Therefore, an appropriate range of the carbon content to increase the transverse-rupture-strength is considered to be particularly in the range of 5.30 to 5.43 wt %.

Figure 5:
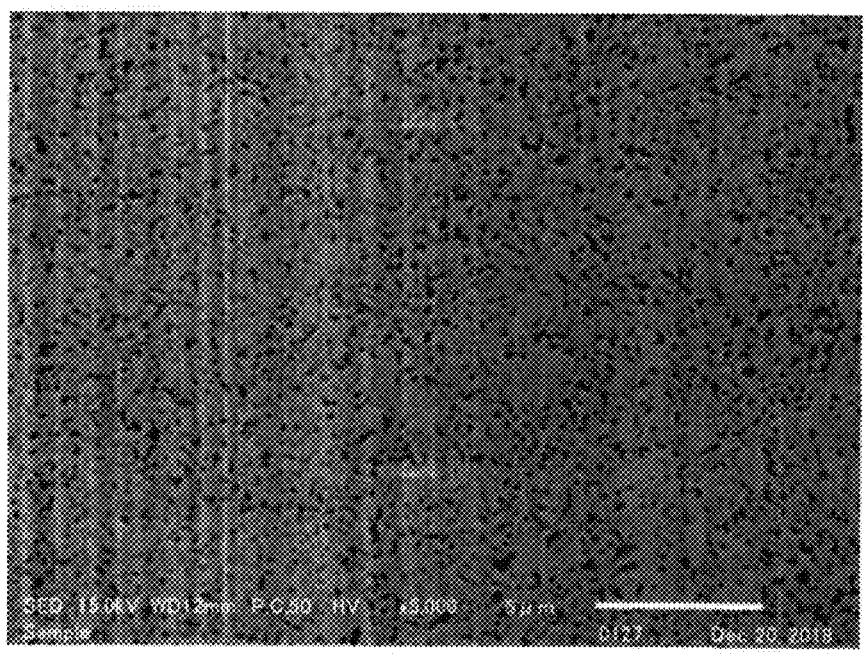
FIG. 5 is a scanning electron microscope (SEM) photograph of an ultra-fine cemented carbide.

FIG. 5 shows a scanning electron microscope (SEM) photograph of the ultra-fine cemented carbide as the sample No. 13 having a transverse-rupture-strength that measured 4.7 GPa.

As can be seen focusing on the hardness (HRA) of the ultra-fine cemented carbide in Table 1, no sample has a hardness lower than 92 HRA, and a relatively high hardness can be maintained regardless of the nitrogen content and the carbon content in the ultra-fine cemented carbide. An ultra-fine cemented carbide can be obtained that can provide a tool in which the wear amount is small.

Furthermore, as described above, the transverse-rupture-strength shows the peak (4.7 GPa) when titanium carbonitride (Ti(C,N)) is contained in an amount of 1.30 wt %. It is also confirmed from Table 1 that the samples containing titanium carbonitride (Ti(C,N)) in an amount of 1.70 wt % (No. 9, 10, 17, 18, 25, 26) and the samples containing titanium carbonitride (Ti(C,N)) in an amount of 2.00 wt % (No. 11, 12, 19, 20, 27, 28) are slightly inferior in transverse-rupture-strength to the samples containing titanium carbonitride (Ti(C,N)) in an amount of 1.30 wt %. It can also be confirmed in Table 1 that it is appropriate to set the amount of the titanium carbonitride (Ti(C,N)) to around 1.30 wt % (0.5 wt % or more and 2.0 wt % or less).

Figure 4:
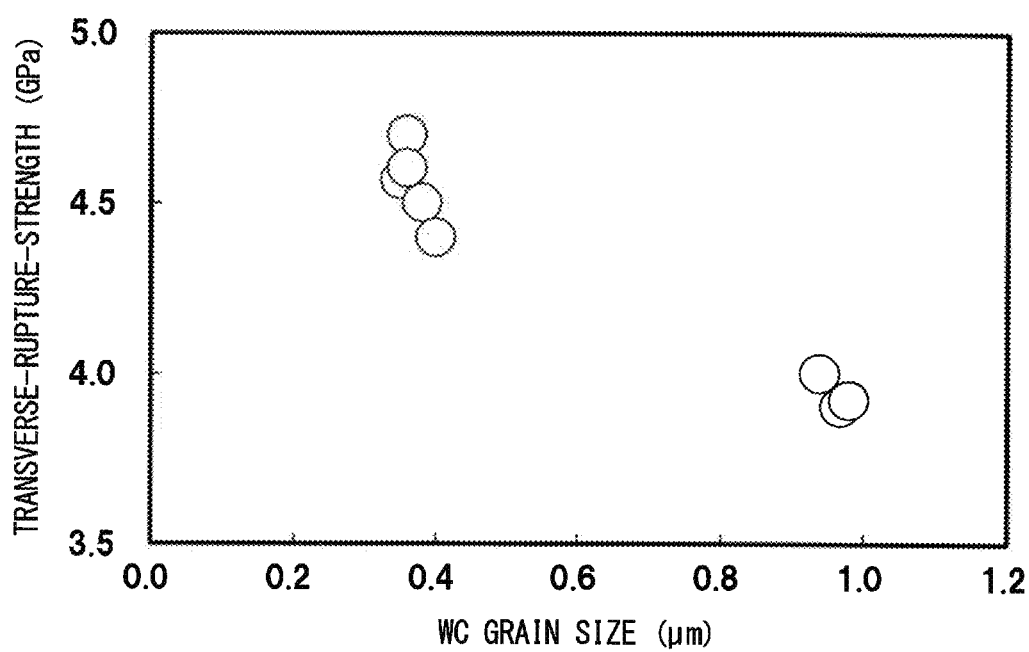
FIG. 4 is a graph showing the relationship between the average grain size of tungsten carbide and the transverse-rupture-strength in an ultra-fine cemented carbide.

Eight ultra-fine cemented carbide samples were prepared by changing the average grain size of tungsten carbide (WC) from the standard value that is the grain size in the sample No. 13, which exhibited the peak transverse-rupture-strength in the analysis results shown in Table 1. FIG. 4 is a graph showing the relationship between the WC grain size and the transverse-rupture-strength in the eight ultra-fine cemented carbide samples. On this graph, eight white circles are plotted to show the relationship between the WC average grain size (shown by the horizontal axis) and the transverse-rupture-strength (shown by the vertical axis) measured for each of the eight samples. The average grain size of tungsten carbide (WC) was measured using an intercept method. The WC average grain size was adjusted by selecting raw material powders having different WC grain sizes.

There is a large difference in transverse-rupture-strength between the samples having a WC average grain size of about 1.0 µm and the samples having a WC average grain size of about 0.40 µm. It is appropriate to set the WC average grain size to 0.80 µm or less in order for the ultra-fine cemented carbide to exhibit a relatively high transverse-rupture-strength, in particular, a high transverse-rupture-strength of more than 4.0 GPa and about 4.5 GPa.

The Vickers hardness (unit: Hv) of the ultra-fine cemented carbide sample No. 13 (containing cobalt in an amount of 10.0 wt %), which showed the peak transverse-rupture-strength in Table 1, was measured in an atmosphere at a high temperature of 400° C., 600° C., and 800° C., and the Vickers hardness of another sample prepared so that the amount of cobalt was 8.0 wt % (sample No. 35) was measured in the same manner in an atmosphere at a high temperature of 400° C., 600° C., and 800° C. Table 3 shows the Vickers hardness of the ultra-fine cemented carbide sample No. 13 and the Vickers hardness of the sample No. 35. The Vickers hardness at each temperature was measured using a high-temperature microhardness tester. Table 3 also shows the Vickers hardness of a conventional cemented carbide having a composition of WC (2.0 µm)-10 wt % Co for reference.

TABLE 3

| | Measurement temperature (° C.) | | |
|---|---|---|---|
| No. | 400 | 600 | 800 |
| 13 (10 wt % Co) | 1497 | 1120 | 623 |
| 35 (8 wt % Co) | 1644 | 1308 | 706 |
| WC (2.0 µm) – 10 wt % Co (conventional example) | 1053 | 815 | 462 |

(Unit: Hv)

Both of the ultra-fine cemented carbide containing cobalt (Co) as a binder phase in an amount of 10.0 wt % (sample No. 13) and the ultra-fine cemented carbide containing cobalt in an amount of 8.0 wt % (sample No. 35) can exhibit a Vickers hardness of 500 Hv or more in the temperature range of 400° C. to 800° C. However, the ultra-fine cemented carbide containing cobalt in a larger amount tends to have a lower hardness in a high-temperature atmosphere. In the ultra-fine cemented carbide used in, for example, a cutting tool exposed to a high temperature, the appropriate upper limit of the amount of cobalt is considered to be about 10.0 wt %. An ultra-fine cemented carbide having excellent hardness in a high-temperature atmosphere can be provided.

What is claimed is:

1. An ultra-fine cemented carbide comprising:
   a hard phase containing tungsten carbide (WC) as a main component, the hard phase in an amount of 70.0 wt % or more and 99.4 wt % or less;
   a carbonitride phase containing titanium carbonitride (Ti(C,N)) as a main component produced by carbonitriding of a titanium (Ti) oxide during sintering under controlling the nitrogen partial pressure during sintering to 0.1 to 10 kPa, the carbonitride phase in an amount of 0.10 wt % or more and 10.0 wt % or less; and
   a binder phase containing at least one selected from cobalt (Co), nickel (Ni), or iron (Fe) as a main component, the binder phase in an amount of 0.50 wt % or more and 20.0 wt % or less, the binder phase containing chromium carbide ($Cr_3C_2$) in an amount of 0.10 wt % or more and 20.0 wt % or less based on all of the binder phase, wherein
   the hard phase, the carbonitride phase, and the binder phase total 100 wt %,
   tungsten carbide after the sintering has an average grain size of 1.0 µm or less,
   a nitrogen content is 0.10 wt % or more and 1.25 wt % or less, and a carbon content is 4.80 wt % or more and 6.30 wt % or less.

2. The ultra-fine cemented carbide according to claim 1, wherein the nitrogen content is 0.10 wt % or more and 0.25 wt % or less.

3. The ultra-fine cemented carbide according to claim 1, wherein the carbon content is 5.30 wt % or more and 5.43 wt % or less.

4. The ultra-fine cemented carbide according to claim 1, wherein the carbonitride phase is included in an amount of 0.5 wt % or more and 2.0 wt % or less.

5. The ultra-fine cemented carbide according to claim 4, wherein the carbonitride phase is included in an amount of 1.30 wt %.

6. The ultra-fine cemented carbide according to claim 1, wherein the tungsten carbide has an average grain size of 0.80 µm or less.

7. The ultra-fine cemented carbide according to claim 1, wherein the binder phase is included in an amount of 10.0 wt % or less.

8. The ultra-fine cemented carbide according to claim 1, wherein the carbon content is 5.31 wt % or more and 5.54 wt % or less.

9. The ultra-fine cemented carbide according to claim 1, wherein the carbon content is 5.30 wt % or more and 5.60 wt % or less.

10. The ultra-fine cemented carbide according to claim 1, wherein the nitrogen content is 0.10 wt % or more and 0.35 wt % or less.

11. The ultra-fine cemented carbide according to claim 1, wherein the carbonitride phase is included in an amount of 1.30 wt %.

12. A cutting tool comprising the ultra-fine cemented carbide according to claim 1.

13. A wear-resistant tool comprising the ultra-fine cemented carbide according to claim 1.

* * * * *